United States Patent
Johnston et al.

(10) Patent No.: US 11,098,221 B2
(45) Date of Patent: *Aug. 24, 2021

(54) ADDITIVES FOR IMPROVING DRA INJECTION

(71) Applicant: LiquidPower Specialty Products Inc., Houston, TX (US)

(72) Inventors: Ray L. Johnston, Ponca City, OK (US); Zhiyi Bao, Greenwood, IN (US); Richard D. Thomas, Ponca City, OK (US); Timothy L. Burden, Ponca City, OK (US)

(73) Assignee: LIQUIDPOWER SPECIALTY PRODUCTS INC., Houston, TX (US)

( * ) Notice: Subject to any disclaimer, the term of this patent is extended or adjusted under 35 U.S.C. 154(b) by 179 days.

This patent is subject to a terminal disclaimer.

(21) Appl. No.: 16/105,041

(22) Filed: Aug. 20, 2018

(65) Prior Publication Data

US 2018/0355209 A1  Dec. 13, 2018

Related U.S. Application Data

(63) Continuation of application No. 13/287,340, filed on Nov. 2, 2011, now Pat. No. 10,053,595.

(60) Provisional application No. 61/414,298, filed on Nov. 16, 2010.

(51) Int. Cl.
| | | |
|---|---|---|
| *C09D 167/00* | (2006.01) | |
| *C08K 5/103* | (2006.01) | |
| *C08K 5/11* | (2006.01) | |
| *C08K 5/12* | (2006.01) | |

(52) U.S. Cl.
CPC ............ *C09D 167/00* (2013.01); *C08K 5/103* (2013.01); *C08K 5/11* (2013.01); *C08K 5/12* (2013.01)

(58) Field of Classification Search
CPC ........ C09D 167/00; C08K 5/103; C08K 5/11; C08K 5/12
See application file for complete search history.

(56) References Cited

U.S. PATENT DOCUMENTS

| | | |
|---|---|---|
| 3,857,402 A | 12/1974 | Schuh |
| 6,242,388 B1 | 6/2001 | Sharma et al. |
| 7,285,582 B2 | 10/2007 | Harris et al. |
| 7,763,671 B2 | 7/2010 | Harris et al. |
| 8,933,149 B2 | 1/2015 | Bucher et al. |
| 10,053,595 B2 * | 8/2018 | Johnston .............. C09D 167/00 |
| 2005/0049327 A1 | 3/2005 | Jovancicevic et al. |
| 2005/0209368 A1 | 9/2005 | Yang et al. |
| 2006/0148928 A1 | 7/2006 | Harris et al. |
| 2008/0149530 A1 | 6/2008 | Milligan et al. |
| 2009/0209679 A1 | 8/2009 | Dreher et al. |
| 2009/0326121 A1 | 12/2009 | Stockl et al. |
| 2010/0130681 A1 | 5/2010 | Smith et al. |
| 2014/0206794 A1 | 7/2014 | Bucher et al. |

FOREIGN PATENT DOCUMENTS

| | | |
|---|---|---|
| EA | 200701413 A1 | 2/2008 |
| MX | 2008003728 A | 2/2009 |
| MX | 2010008968 A | 9/2010 |
| WO | 2008/020212 A1 | 2/2008 |

OTHER PUBLICATIONS

Written Opinion for Brazilian Application No. 1120130120932 dated Mar. 31, 2020.
Search Report for Brazilian Application No. 112013012093 dated Mar. 31, 2020.
GCC Examination Report for Application No. GC 2011-19762; dated Oct. 2, 2018; 4 total pages.
PCT Search Report for Application No. PCT/US 11/58904; dated Mar. 16, 2012; 3 total pages.
Colombia Office Action for Application No. 13-119.338; dated Feb. 10, 2017; 7 total pages.
Mexican Office Action for Application No. 13623; dated Feb. 20, 2017; 3 total pages.
Eurasian Office Action (with attached English translation) for Application No. 201390718; dated Mar. 21, 2017; 7 total pages.
Peru Office Action for Application No. 001085-2013/DIN; dated Oct. 23, 2017; 8 total pages.
GCC Examination Report for Application No. GC 2011-19762; dated Nov. 12, 2017; 3 total pages.
European Patent Office; Extended Search Report for Application No. 11842067.8; dated Dec. 1, 2017; 7 total pages.
Indian Office Action for Application 4381/DELNP/2013; dated Dec. 27, 2017; 7 total pages.
Canadian Office Action for Application No. 2,817,325; dated Feb. 13, 2018; 5 total pages.
GCC Examination Report for Application No. GC 2011-19762; dated Apr. 10, 2018; 5 total pages.
Argentina Office Action (with attached English translation) for Application No. 20110104283; dated Jun. 13, 2018; 9 total pages.
Canadian Office Action for Application No. 2,817,325; dated Oct. 30, 2018; 4 total pages.
Brazilian Office Action (with attached English translation) for Application No. BR112013012093-2; dated May 27, 2019; 6 total pages.
Colombian Office Action (with attached English translation) for Application No. 13119338; dated Jun. 12, 2019; 12 total pages.
Canadian Office Action for Application No. 2,817,325; dated Jun. 20, 2019; 3 total pages.

\* cited by examiner

*Primary Examiner* — Edward J Cain
(74) *Attorney, Agent, or Firm* — Patterson + Sheridan, LLP

(57) ABSTRACT

A composition comprising a drag reducing latex formulation produced by emulsion polymerization to create solid particles dispersed in an aqueous medium and an additive. The use of the composition results in a decrease of film formation while injected through a pump head when compared to the drag reducing latex formulation injected through the pump head.

20 Claims, No Drawings

ADDITIVES FOR IMPROVING DRA INJECTION

CROSS-REFERENCE TO RELATED APPLICATIONS

This application is a continuation application of co-pending U.S. patent application Ser. No. 13/287,340, filed on Nov. 2, 2011, which claims benefit of U.S. Provisional Patent Application Ser. No. 61/414,298, filed on Nov. 16, 2010. Each of these patent applications is incorporated herein by reference.

BACKGROUND

Field

Methods of improving injection of drag reducing agents include adding an additive to a drag reducing latex formulation prior to injection into a pipeline.

The use of polyalpha-olefins or copolymers thereof to reduce the drag of a hydrocarbon flowing through a conduit, and hence the energy requirements for such fluid hydrocarbon transportation, is well known. These drag reducing agents or DRAs have taken various forms in the past, including slurries or dispersions of ground polymers to form free-flowing and pumpable mixtures in liquid media.

A stable DRA (drag reducing agent) suspension is generally comprised of (1) DRA polymer particles, (2) liquid carrier, and (3) suspension aids.

In general, the DRA polymer may be obtained from solution polymerization of a water-insoluble monomer or a mixture of monomers which are subsequently precipitated to form the solid polymer particles, or from bulk polymerization (i.e., polymerization with no solvent) of said monomer(s) to form polymer which is subsequently ground into particles (which grinding may tend to degrade the polymer and its drag reduction efficiency), or produced by emulsion polymerization whereby the monomer(s) are dispersed with a large quantity of surfactant in a continuous liquid carrier prior to polymerization. The subsequent emulsion polymerization produces extremely small particles of polymer from the dispersed monomer.

The liquid carrier is preferentially a non-solvent for the DRA polymer and can vary widely, including aqueous and non-aqueous liquids, e.g., water or aqueous solutions of various pH and ionic strengths, alcohols and fatty alcohols, glycols and diols, glycol ethers, glycol esters, or mixtures of these.

Suspension aids are a necessity for DRA polymer suspensions made from solution or bulk polymerization, since such polymer particles are soft and tacky and will form films, when their unaltered surfaces come in mutual contact. Many suspension aids may be employed, e.g., stearic acid and stearate salts (magnesium stearate, calcium stearate), stearamides, polyolefin homopolymers and copolymers of various densities; oxidized polyethylene (PE); polystyrene and copolymers; carbon black and graphites; micronized polyphenyl sulfide (PPS), polypropylene oxide (PPO), polyamides, polyethylene terephthalate (PET), polybutylene terephthalate (PBT), polyvinyl chloride (PVC); precipitated and fumed silicas; natural or synthetic clays, and organo-clays; aluminum oxides; boric acid; magnesium, calcium and barium phosphates, sulfates, carbonates or oxides, and the like. Many such suspension aids require heating to reach maximum effectiveness in a formulation. However, heating a process stream is economically disadvantageous in commercial production.

One common solution to preventing film formation is to coat the ground polymer particles with an anti-agglomerating agent. Cryogenic grinding of the polymers to produce the particles prior to or simultaneously with coating with an anti-agglomerating agent has also been used. However, some powdered or particulate DRA slurries require special equipment for preparation, storage and injection into a conduit to ensure that the DRA is completely dissolved in the hydrocarbon stream.

Gel or solution DRAs have also been tried in the past. However, these drag reducing gels also demand specialized injection equipment, as well as pressurized delivery systems. They are also limited to about 10% polymer as a maximum concentration in a carrier fluid due to the high solution viscosity of these DRAs. Thus, transportation costs of the DRA is considerable, since up to about 90% of the volume is inert material.

Thus, it would be desirable if a drag reducing agent could be developed which rapidly dissolves in the flowing hydrocarbon, which could minimize or eliminate the need for special equipment for preparation and incorporation into the hydrocarbon, and which could be injected into a pipeline without any issues.

SUMMARY

A composition comprising a drag reducing latex formulation produced by emulsion polymerization to create solid particles dispersed in an aqueous medium and an additive. The use of the composition results in a decrease of film formation while injected through a pump head when compared to the drag reducing latex formulation injected through the pump head.

In an alternate embodiment the composition comprises an acrylate drag reducing latex formulation produced by emulsion polymerization to create solid particles dispersed in an aqueous medium and an additive. In this embodiment the additive is added in the range between 1% to 20% by weight, and the composition results in a decrease of film formation of at least 50% when compared to the acrylate drag reducing latex formulation injected through the pump head through a four hour time frame.

A method is also taught wherein a composition is injected through a pump head wherein the composition produces at least 50% less film formation through a four hour time frame than injection of a drag reducing latex formulation through the pump head. In this method the composition comprises the drag reducing latex formulation produced by emulsion polymerization to create solid particles dispersed in an aqueous medium and an additive.

In an alternate embodiment a method is taught where a composition is injected through a pump head wherein the composition produces at least 50% less film formation through a four hour time frame than injection of a drag reducing latex formulation through the pump head. In this method the composition comprises the acrylate drag reducing latex formulation produced by emulsion polymerization to create solid particles dispersed in an aqueous medium and an additive added in the range between 1% to 20% by weight.

BRIEF DESCRIPTION OF THE DRAWINGS

The invention, together with further advantages thereof, may best be understood by reference to the following description taken in conjunction with the accompanying drawings.
None

DETAILED DESCRIPTION

A composition comprises a drag reducing latex formulation produced by emulsion polymerization to create solid particles dispersed in an aqueous medium and an additive. The use of the composition results in a decrease of film formation while injected through a pump head when compared to the drag reducing latex formulation injected through the pump head.

In this embodiment the drag reducing latex formulation is any known drag reducing latex formulation that would create a film formation when injected through a pump head. The film formation on the pump head causes clogging of the pump head and an inability for the drag reducing latex formulation to be injected. The problem of film formation is particularly evident when utilizing latex drag reducing formulations for hydrocarbons. The problem is even more evident when using acrylate based drag reducing latex formulation. It is important to note that the drag reducing latex formulations decrease the drag of the hydrocarbon fluid they are injected into without significantly altering the viscosity of the hydrocarbon fluid.

The additive that is added to the drag reducing latex formulation is any additive that would cause the composition to result in a decrease of film formation of at least 10% when compared to the drag reducing latex formulation injected through the pump head through a four hour time frame. In alternate embodiment it has been shown that the decrease of film formation of the composition can range from 10%, 20%, 30%, 40%, 50%, 60%, 70%, 80% even 90% or higher over the drag reducing latex formulation injected through a similar pump head through a four hour time frame.

The pump head can be any pump head currently known in the art capable of injecting a drag reducing latex formulation. Commonly known pumps currently in use include packed reciprocating plunger pumps, high-pressure hydraulically actuated diaphragm pumps or even pneumatically driven plunger pumps.

In one embodiment the additive can be a single chemical additive or mixture of more than one chemical additive. The additive can be an ester derivative, which is capable of reducing film formation when injected through a pump head. In an alternate embodiment the additive is an ester derivative of a polyol or an ester derivative of a poly(carboxylic acids) or combinations of these ester deriviatives such that there is one or more ester functionality on the individual molecules. In one embodiment the additive is a 2,2,4-trimethyl-1,3-pentanediol diisobutyrate, bis(2ethylhexyl) adipate, glyceryl tributyrate, trimethyl pentanediol monoisobutyrate, dibutyl phthalate, dioctyl phthalate, glyceryl triacetate, dioctyl azelate, epoxidized tallate, triisooctyl trimellitate, triisononyl trimellite epoxidized soybean oil, dibutyl phthalate, butyl benzyl phthalate, dihexyl phthalate, $C_6$-$C_{11}$ phthalate, diisononyl phthalate, diisodecyl phthalate, ditridecyl phthalate or combinations of these additives. The additive can be added to the drag reducing latex formulation in the range between 1% to 8% or 1% to 10% or even 1% to 20% by weight. The upper limit of adding the additive to the drag reducing latex formulation is limited by the economics and the lowered efficiency of the drag reducing latex formulation as a whole due to the dilution of the active drag reducing latex formulation.

The addition of the additive to the drag reducing latex formulation is not dependent upon the method of manufacturing the drag reducing latex formulation. The additive can be incorporated prior to the reaction into the reagent mixture or it can be added and mixed into the drag reducing latex formulation as a post-additive.

In an alternate embodiment the composition comprises an acrylate drag reducing latex formulation produced by emulsion polymerization to create solid particles dispersed in an aqueous medium and an additive comprising 2,2,4-trimethyl-1,3-pentanediol diisobutyrate. In this embodiment the additive is added in the range between 1% to 8% by weight, and the composition results in a decrease of film formation of at least 50% when compared to the drag reducing latex formulation injected through the pump head through a four hour time frame.

A method is also taught wherein a composition is injected through a pump head wherein the composition produces at least 30% less film formation through a four hour time frame than injection of a drag reducing latex formulation through the pump head. In this method the composition comprises the drag reducing latex formulation produced by emulsion polymerization to create solid particles dispersed in an aqueous medium and an additive.

In an alternate embodiment a method is taught where a composition is injected through a pump head wherein the composition produces at least 30% less film formation through a four hour time frame than injection of a drag reducing latex formulation through the pump head. In this method the composition comprises the acrylate drag reducing latex formulation produced by emulsion polymerization to create solid particles dispersed in an aqueous medium and an additive of 2,2,4-trimethyl-1,3-pentanediol diisobutyrate added in the range between 1% to 8% by weight.

EXAMPLES

In this example a peristaltic pump is used to simulate the injection of drag reducing latex formulation through a pump head. In each of these examples a latex meth(acrylate) drag reducer was utilized. The rate of flow through the peristaltic pump was 40 cc/min over a time frame of four hours. The flex tubing of the peristaltic pump was weighed prior to the pumping and post pumping to determine the build up of film formation inside the flex tubing.

| Test | Additive | Amt of film formation |
|---|---|---|
| 1 | 2%-2,2,4-trimethyl-1,3-pentanediol diisobutyrate-post addition | 1.63 grams |
| 2 | 4%-2,2,4-trimethyl-1,3-pentanediol diisobutyrate-pre addition | 0.55 grams |
| 3 | 8%-2,2,4-trimethyl-1,3-pentanediol diisobutyrate-pre addition | 0.07 grams |
| 4 | 4%-2,2,4-trimethyl-1,3-pentanediol diisobutyrate-post addition | 0.15 grams |
| 5 | No Additive | 1.32 grams |

-continued

| Test | Additive | Amt of film formation |
|---|---|---|
| 6 | No Additive | 1.28 grams |
| 7 | 4%-2,2,4-trimethyl-1,3-pentanediol diisobutyrate-post addition | .55 grams |
| 8 | 6%-2,2,4-trimethyl-1,3-pentanediol diisobutyrate-post addition | 0.21 grams |
| 9 | 8%-2,2,4-trimethyl-1,3-pentanediol diisobutyrate-post addition | 0.07 grams |
| 10 | 4%-bis(2-ethylhexyl)adipate-post addition | 0.39 grams |
| 11 | 6%-bis(2-ethylhexyl)adipate-post addition | 0.13 grams |
| 12 | 4%-2,2,4-trimethyl-1,3-pentanediol diisobutyrate-pre addition | 0.15 grams |
| 13 | 4%-bis(2-ethylhexyl)adipate-pre addition | 0.26 grams |
| 14 | 6%-Dibutyl Phthalate-post addition | 0.21 grams |
| 15 | 6%-Glyceryl Tributyrate-post addition | 0.30 grams |
| 16 | 6%-2,2,4-trimethyl-1,3-pentanediol diisobutyrate-pre addition | 0.06 grams |
| 17 | 4%-2,2,4-trimethyl-1,3-pentanediol diisobutyrate-pre addition + 2%-2,2,4-trimethyl-1,3-pentanediol diisobutyrate-post addition | 0.09 grams |
| 18 | 2%-2,2,4-trimethyl-1,3-pentanediol diisobutyrate-pre addition + 4%-2,2,4-trimethyl-1,3-pentanediol diisobutyrate-post addition | 0.12 grams |
| 19 | 3%-2,2,4-trimethyl-1,3-pentanediol diisobutyrate-post addition + 3%-bis(2-ethylhexyl)adipate-post addition | 0.23 grams |
| 20 | 8%-2,2,4-trimethyl-1,3-pentanediol diisobutyrate-post addition | 0.07 grams |
| 21 | 4%-2,2,4-trimethyl-1,3-pentanediol diisobutyrate-pre addition | 0.08 grams |
| 22 | 4%-bis(2-ethylhexyl)adipate-pre addition | 0.22 grams |
| 23 | 2%-2,2,4-trimethyl-1,3-pentanediol diisobutyrate-pre addition + 4%-2,2,4-trimethyl-1,3-pentanediol diisobutyrate-post addition | 0.13 grams |
| 24 | 2%-2,2,4-trimethyl-1,3-pentanediol diisobutyrate-pre addition + 6%-2,2,4-trimethyl-1,3-pentanediol diisobutyrate-post addition | 0.08 grams |
| 25 | 2%-bis(2-ethylhexyl)adipate-pre addition + 4%-2,2,4-trimethyl-1,3-pentanediol diisobutyrate-post addition | 0.16 grams |
| 26 | 4%-bis(2-ethylhexyl)adipate-pre addition + 2%-2,2,4-trimethyl-1,3-pentanediol diisobutyrate-post addition | 0.15 grams |

The preferred embodiment of the present invention has been disclosed and illustrated. However, the invention is intended to be as broad as defined in the claims below. Those skilled in the art may be able to study the preferred embodiments and identify other ways to practice the invention that are not exactly as described herein. It is the intent of the inventors that variations and equivalents of the invention are within the scope of the claims below and the description, abstract and drawings are not to be used to limit the scope of the invention.

The invention claimed is:

1. A composition comprising:
a drag reducing latex formulation; and
an additive selected from the group consisting of 2,2,4-trimethyl-1,3-pentane diol diisobutyrate, dioctyl adipate, bis(2-ethylhexyl) adipate, glyceryl tributyrate, trimethyl pentanediol monoisobutyrate, dibutyl phthalate, dioctyl phthalate, glyceryl triacetate, dioctyl azelate, epoxidized tallate, triisooctyl trimellitate, triisononyl trimellitate, epoxidized soybean oil, dibutyl phthalate, butyl benzyl phthalate, dihexyl phathalate, $C_6$-$C_{11}$ phthalate, diisononyl phthalate, diisodecyl phthalate, ditridecyl phthalate and combinations thereof.

2. The composition of claim 1, wherein the drag reducing latex formulation is an acrylate drag reducing formulation.

3. The composition of claim 1, wherein the additive is about 1% to about 20% by weight of the composition.

4. The composition of claim 3, wherein the additive is about 1% to about 10% by weight of the composition.

5. The composition of claim 1, wherein the composition results in at least 10% decrease of film formation in a pump head when compared to the drag reducing latex formulation injected through the pump head through a four hour time frame.

6. The composition of claim 5, wherein the composition results in at least 50% decrease of film formation in a pump head when compared to the drag reducing latex formulation injected through the pump head through a four hour time frame.

7. The composition of claim 1, wherein the additive is selected from the group consisting of 2,2,4-trimethyl-1,3-pentanediol diisobutyrate, dioctyl adipate, bis(2-ethylhexyl) adipate and combinations thereof.

8. The composition of claim 1, wherein the drag reducing latex formulation comprises solid particles dispersed in an aqueous medium.

9. A composition comprising:
an acrylate drag reducing latex formulation; and
an additive, wherein the additive is selected from the group consisting of 2,2,4-trimethyl-1,3-pentane diol diisobutyrate, dioctyl adipate, bis(2-ethylhexyl) adipate, glyceryl tributyrate, trimethyl pentanediol monoisobutyrate, dibutyl phthalate, dioctyl phthalate, glyceryl triacetate, dioctyl azelate, epoxidized tallate, triisooctyl trimellitate, triisononyl trimellitate, epoxidized soybean oil, dibutyl phthalate, butyl benzyl phthalate, dihexyl phathalate, $C_6$-$C_{11}$ phthalate, diisononyl phthalate, diisodecyl phthalate, ditridecyl phthalate and combinations thereof, wherein the additive is added in the range between 1% to 20% by weight.

10. The composition of claim 9, wherein the composition results in at least 10% decrease of film formation in a pump head when compared to the acrylate drag reducing latex formulation injected through the pump head through a four hour time frame.

11. The composition of claim 10, wherein the composition results in at least 50% decrease of film formation in a pump head when compared to the acrylate drag reducing latex formulation injected through the pump head through a four hour time frame.

12. The composition of claim 9, wherein the additive is about 1% to about 10% by weight of the composition.

13. The composition of claim 9, wherein the additive is selected from the group consisting of 2,2,4-trimethyl-1,3-pentanediol diisobutyrate, dioctyl adipate, bis(2-ethylhexyl) adipate and combinations thereof.

14. The composition of claim 9, wherein the acrylate drag reducing latex formulation comprises solid particles dispersed in an aqueous medium.

15. A method comprising:
injecting a composition of claim 1 through a pump head, wherein the composition produces at least 50% less film formation by a drag reducing latex formulation through a four hour time frame than injection of the composition through the pump head.

16. The method of claim 15, wherein the drag reducing latex formulation is an acrylate drag reducing formulation.

17. The method of claim 16, wherein the additive is selected from the group consisting of 2,2,4-trimethyl-1,3-pentanediol diisobutyrate, dioctyl adipate, bis(2-ethylhexyl) adipate and combinations thereof.

18. The method of claim 17, wherein the additive is about 1% to about 10% by weight of the composition.

19. The method of claim 18, wherein the drag reducing latex formulation comprises solid particles dispersed in an aqueous medium.

20. The method of claim 15, wherein the additive is about 1% to about 10% by weight of the composition.

\* \* \* \* \*